United States Patent
Van Der Zanden et al.

(10) Patent No.: US 9,606,615 B2
(45) Date of Patent: Mar. 28, 2017

(54) APPARATUS, METHOD AND COMPUTER PROGRAM MEANS FOR DATA TRANSPORT WITH REDUCED POWER CONSUMPTION DURING LINK IDLE TIMES

(71) Applicant: PHILIPS LIGHTING HOLDING B.V., Eindhoven (NL)

(72) Inventors: Henricus Theodorus Van Der Zanden, Sint-Oedenrode (NL); Lennart Yseboodt, Vorselaar (BE); Matthias Wendt, Würselen (DE); Bob Bernardus Anthonius Theunissen, Zaltbommel (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 109 days.

(21) Appl. No.: 14/406,597

(22) PCT Filed: Jun. 28, 2013

(86) PCT No.: PCT/IB2013/055334
§ 371 (c)(1),
(2) Date: Dec. 9, 2014

(87) PCT Pub. No.: WO2014/002073
PCT Pub. Date: Jan. 3, 2014

(65) Prior Publication Data
US 2015/0160719 A1    Jun. 11, 2015

Related U.S. Application Data

(60) Provisional application No. 61/665,947, filed on Jun. 29, 2012.

(51) Int. Cl.
*G06F 1/26* (2006.01)
*G06F 1/32* (2006.01)
*H04L 12/10* (2006.01)

(52) U.S. Cl.
CPC ............ *G06F 1/3293* (2013.01); *G06F 1/324* (2013.01); *G06F 1/3243* (2013.01); *H04L 12/10* (2013.01)

(58) Field of Classification Search
CPC ...... G06F 1/324; G06F 1/3243; G06F 1/3293; H04L 12/10
(Continued)

(56) References Cited

U.S. PATENT DOCUMENTS 6,513,128 B1 * 1/2003 Wang ................. G06F 1/32 713/322
2003/0206564 A1 11/2003 Mills et al.
(Continued)

FOREIGN PATENT DOCUMENTS

EP    2051437 A1    4/2009
WO    2010121993 A1    10/2010
(Continued)

OTHER PUBLICATIONS

"Part 3: Carrier Sense Multiple Access With Collision Detection (CSMA/CD) Access Method and Physical Layer Specification, Amendments: Data Terminal Equipment (DTE) Power Via Media Dependent Interface (MDI)", IEEE Computer Society, Jun. 18, 2003.

*Primary Examiner* — Mark Connolly

(57) ABSTRACT

The present invention relates to a method and apparatus for disconnecting a bias current circuitry (140) in a way that there is no bias current flowing anymore for the transmit output of a network controller (110), e.g. Ethernet controller. Also, the data connection, e.g., TX+ and TX− lines in or at an Ethernet connector (120), are connected to a control circuitry (130) to simulate an active connection by taking over supply of link activation pulses, e.g., link integrity test (LIT) pulses. These two measures will allow the user to save (Continued)

the bias current on the transmit output and maintain the link activation signals to keep the link up towards a network controller (110).

14 Claims, 3 Drawing Sheets

(58) Field of Classification Search
USPC .......................................... 713/300, 320, 324
See application file for complete search history.

(56) References Cited

U.S. PATENT DOCUMENTS

| | | |
|---|---|---|
| 2008/0254842 A1 | 10/2008 | Lin |
| 2009/0096592 A1 | 4/2009 | Wu et al. |
| 2009/0125735 A1 | 5/2009 | Zimmerman |
| 2009/0212829 A1 | 8/2009 | Kan et al. |
| 2009/0282277 A1 | 11/2009 | Sedarat et al. |
| 2010/0180133 A1 | 7/2010 | Chen |

FOREIGN PATENT DOCUMENTS

| | | |
|---|---|---|
| WO | 2012028979 A1 | 3/2012 |
| WO | 2013050970 A1 | 4/2013 |

\* cited by examiner

APPARATUS, METHOD AND COMPUTER PROGRAM MEANS FOR DATA TRANSPORT WITH REDUCED POWER CONSUMPTION DURING LINK IDLE TIMES

CROSS-REFERENCE TO PRIOR APPLICATIONS

This application is the U.S. National Phase application under 35 U.S.C. §371 of International Application No. PCT/IB13/055334, filed on Jun. 28, 2013, which claims the benefit of U.S. Provisional Patent Application No. 61/665,947, filed on Jun. 29, 2012. These applications are hereby incorporated by reference herein.

FIELD OF THE INVENTION

The invention relates to an apparatus for controlling data transport via a network connection (e.g. Ethernet connection), a network device comprising the apparatus, and a system comprising the apparatus, an electrical consumer and the data connection. The invention further relates to a corresponding method and a corresponding computer program.

BACKGROUND OF THE INVENTION

Ethernet is a family of computer networking technologies for local area networks (LANs). Ethernet was commercially introduced in 1980 and standardized in 1985 as IEEE 802.3 by the Institute of Electrical and Electronics Engineers (IEEE). Ethernet has largely replaced competing wired LAN technologies.

The Ethernet standards comprise several wiring and signaling variants of the Open Systems Interconnection (OSI) physical layer in use with Ethernet. The original 10BASE5 Ethernet used coaxial cable as a shared medium. Later the coaxial cables were replaced by twisted pair and fiber optic links in conjunction with hubs or switches.

A switch is a telecommunication device which receives a message from any device connected to it and then transmits the message only to that device for which the message was meant. This makes the switch a more intelligent device than a hub (which receives a message and then transmits it to all the other devices on its network). The network switch plays an integral part in most modern LANs.

An Ethernet device that is connected to a switch has to keep the link activated, since when the link is lost on a certain port, the switch will no longer send data to that port. The device needs to send a single pulse or a series of pulses which are called Link Integrity Test (LIT) pulses in the 10BASE-T terminology. 10BASE-T was designed for point-to-point links only, and all termination was built into the Ethernet device. Higher speed connections use initial auto-negotiation to negotiate about speed, half duplex and full duplex and master/slave. This auto-negotiation is based on pulses similar to those used by 10BASE-T devices to detect the presence of a connection to another device. When the auto-negotiation has finished, the devices only send an idle byte when there is no data send, to keep the link up.

Power-over-Ethernet (PoE) is an active standard (IEEE 802.3.af and IEEE 802.3.at) which allows a PoE supply to provide electrical energy to detached networked electrical consumers like routers, switches, printer spoolers, et cetera over their standard Ethernet cable connection. Here actual standardization is going to support power levels even above 50 W per Cat5 connection. Currently, discussions are coming up to use the same standard for all kinds of low power consumers like lighting equipment (sensors, switches, light sources) or entertainment appliances like active speakers, internet radios, Digital Versatile Disk (DVD) players, set-top boxes and even television (TV) sets. PoE phones and PoE powered control devices are becoming already common practice in offices.

As the industry is more and more discussing direct current (DC) distribution as an efficient future alternative for the well known alternating current (AC) mains, also supplying power to lighting devices via PoE may get used widely.

However, if the detached networked electrical consumers are in their standby state they still take some power from the PoE power supply to keep internal processing alert to be able to react on any Ethernet activity. Thus, even in the standby state of the detached networked electrical consumers the power consumption is quite high. In current systems the link is kept fully active, which consumes a lot of energy. In a lighting system using PoE for powering the luminairs this can add up to several hundreds of mW standby power even when the luminairs are switched off.

SUMMARY OF THE INVENTION

It is an object of the invention to provide a network connection with reduced idle transmit power consumption.

This object is achieved by an apparatus as claimed in claim 1, by a network device as claimed in claim 7, by a system as claimed in claim 10, by a method as claimed in claim 13, and by a computer program product as claimed in claim 14.

Accordingly, an option is provided to disconnect a bias current circuitry in a way that there is no bias current flowing anymore for the transmit output of a network controller. The lines of the network connector or port are connected to a control circuitry to control the transmission output of the network connector to fake any link activation signals. This control circuitry can be directly implemented or controlled for example by general purpose ports of a micro controller or an oscillator. Thereby, bias current on the transmit output can be saved and the link activation signals can be maintained to keep the link up towards the network. Since there are no signals transmitted during this link fake, the transmitter part of the power-supplying network controller (e.g. Ethernet controller) may be switched off, as well as other parts which are not necessary to run during the fake link.

The network switch or hub keeps thinking a full two-way communication link is up, but only the receiving part of the connected device is operational. The transmitting part will only be switched on if necessary. A network device with the proposed apparatus or a corresponding operation method or software routine will thus "fake" a link for the switch where the device is connected to. The switch or hub will think the connection is up, and therefore communicate to the device(s) connected. The proposed network device only transmits the link activation signals or data necessary to keep the link up. These are, for example, the LIT pulses in a 10BASE-T system as described above or any other way of keeping the link up.

According to a first aspect, the apparatus may be adapted to set the network controller into a listen-only mode where the network controller can only receive data but can not transmit data via the network connection. Thereby, bias current of the transmit output of the network controller can be saved.

According to a second aspect which can be combined with the first aspect, the power supply may comprise a bias current supplied to a differential transmit output of the network controller. By interrupting the supply of the bias current drained via the network connection, power consumption can be reduced during link idle times.

According to a third aspect which may be combined with the first or second aspect, the apparatus may comprises a micro controller or an oscillator. This, allows use of general purpose ports of general purpose devices to implement the proposed link faking mechanism.

According to a fourth aspect which can be combined with any one of the first to third aspects, the network controller may be an Ethernet controller and the network connection may be an Ethernet link.

According to a fifth aspect which can be combined with any one of the first to fourth aspects, a transmitting part of a network controller of a network device may be controlled by the apparatus so as to be set into a listen-only mode where the network controller can only receive data but can not transmit data via the network connection, when no data is to be transmitted by the network device via the network connection. Thus, it can be ensured that no bias current is drained via the transmitting part when no data is transmitted by the network device via the network connection.

According to a sixth aspect which can be combined with any one of the first to fifth aspects, a switching element may be controlled by the apparatus to disconnect a power supply from the output of the network controller. Thereby, interruption of the power supply to the output of the network controller can be reliably controlled.

According to a seventh aspect which can be combined with any one of the first to sixth aspects, the network device may comprise an electrical consumer. This provides the advantage that electrical consumers, such a lighting devices (e.g. a light sources or luminaires), sensors, switches, or the like can be controlled and optionally powered via network connections, while idle power consumption is reduced substantially. In case the network device is powered over the network connection, a respective power supply unit (e.g. PoE unit) may be provided in the network device. Thereby, PoE standards IEEE 802.3.af and IEEE 802.3at or other power-over-network standards can be enhanced to reduce power consumption in periods of no transmit activity or link idle times. This can also apply for the normal Ethernet standard or other network standards involving link activation signals for keeping network links active.

Further advantageous embodiments are defined below.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Embodiments are now described based on a system for connecting a device to a network which requires transmission of activation signals to keep network connections active. Optionally, a PoE system or other system for powering at least one electrical consumer via a network connection may be provided as well.

Figure 1:
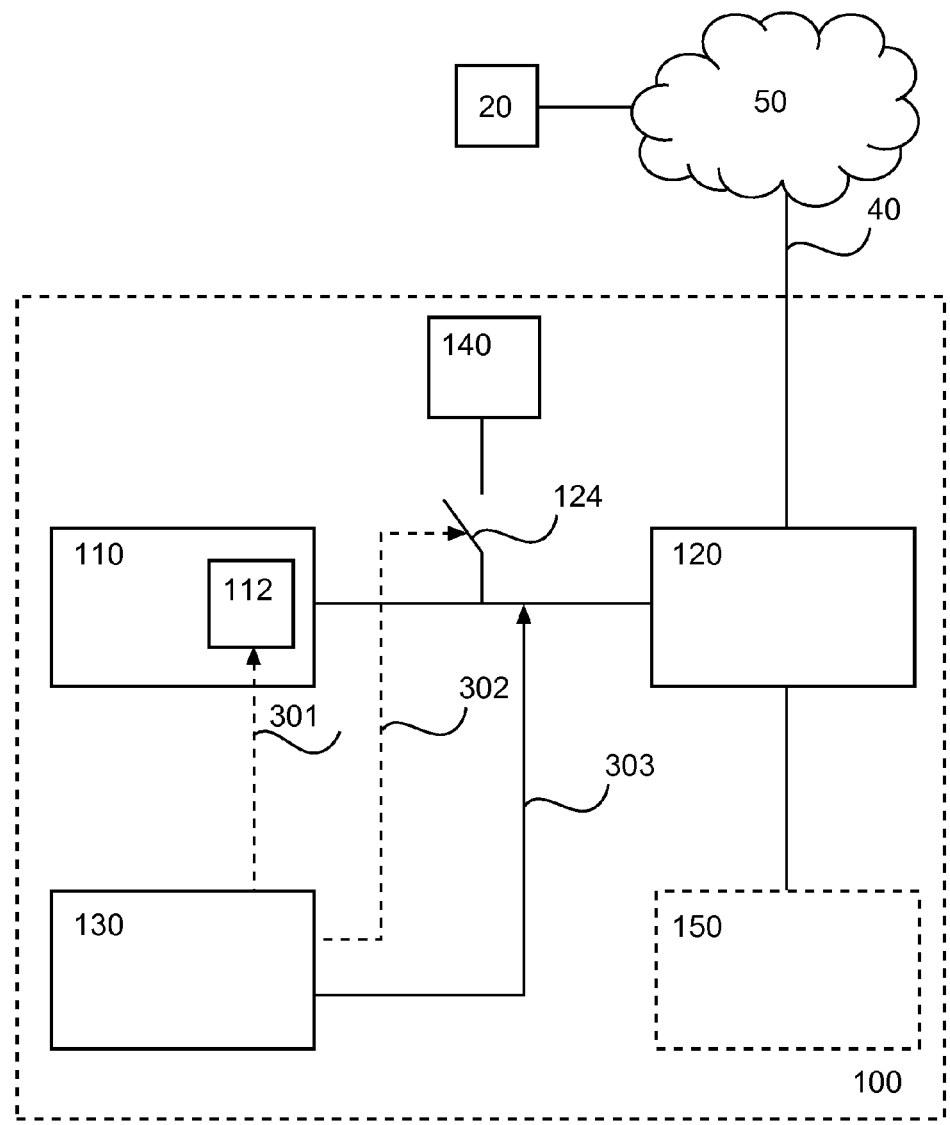
FIG. 1 shows a schematic block diagram of a network system comprising a network device according to a first embodiment of the present invention.

FIG. 1 shows a schematic block diagram of a network system comprising a network device 100 (e.g. an electrical consumer) according to a first embodiment which can be connected by a network connection 40 of a network (e.g. Ethernet) 50 to another network device 20. The data connection can be an Ethernet cable, for example. The network device 100 comprises a network controller (e.g. Ethernet controller) 110 and an Ethernet interface or port 120 for transmitting user and/or control data to the network 50 via the network connection 40. The other network device 20 may also comprise an Ethernet controller and port (nor shown) for enabling a connection to the network 50. Additionally, a power supply 140 is provided in the network device 100 for supplying a bias current via an internal link at least to the output of the network controller 110.

The network device 100 may be, for example, a lighting device such as a light source or luminaire, a sensor, a switch, et cetera. Data received via the network connection 40 may be commands transported in a data packet over the network 50 to a data receiving unit (not shown) of the network device 100. Thus, the data received by the data receiving unit may contain a command like a switch-off command or a dim-to-zero command (if the network device 100 is a light source) and network address (e.g. an Internet Protocol (IP) address) of the network device 100.

Optionally, a network power supply unit (e.g. PoE supply unit) 150 may be provided to power the network device 100 via the network connection 40. In case of PoE, the network controller 110 may be adapted to follow the standard of PoE for activating the supply of power to the network device 100 via the network connection 40, which is disclosed in, for example, "Part 3: Carrier Sense Multiple Access with Collision Detection (CSMA/CD) Access Method and Physical Layer Specifications, Amendment: Data Terminal Equipment (DTE) Power via Media Dependent Interface (MDI)", IEEE Computer Society, 18 Jun. 2003.

During an inactive link, only the pulses to keep the link activated or the idle bytes need to be sent. Thus, only useless current is drawn from the power supply 140 for only keeping the link up. To reduce power consumption, a link control unit 130 is provided as a separate unit or as a unit or function integrated to the network controller 110. The link control unit 130 is adapted to check whether data needs to be transmitted on the data connection and, if not, it switches to a power-saving mode by controlling a switch 124, provided between the power source 140 and the internal link, via a power control signal 302 to open the connection and interrupt bias current supply from the power source 140 the contoller output. As an alternative, the power control signal 302 may directly control the power source 140 to switch off bias current supply to the internal link. Additionally, the link control unit 130 generates fake link activation signals (e.g. LIT pulses) 303 to be supplied to the network connection 40 to simulate the signals necessary to keep the link activated for allowing data reception. Since no signals are transmitted by the network controller 110 during such a link fake, the network controller 110 may be set into a listen-only mode where at least a transmitter part 112 of the network controller 110 is switched off or deactivated through a transmission control signal 301 generated by the link control unit 130. Additionally, other parts of the network controller 110, which are not necessary during the listen-only mode with simulated link activation signals may be deactivated as well.

The link control unit 130 (which may be a micro controller or an oscillator or a pulse generator or another suitable circuit which provides the described functionality) can be adapted (e.g. by running a corresponding program or subroutine and/or by having a corresponding hardware configuration) to receive all kinds of input from the network device 100 and the electronics connected to the network device 100, and to determine whether data needs to be transmitted. In case data needs to be transmitted, it "starts" or activates the transmitter part 112 of the network controller 110 and "starts" or activares the bias supply of the power source 140 and stops or deactivates the proposed fake link mechanism. By doing this, the normal link mechanism is operational again. The link control unit 130 can now transmit the necessary data, and after transmitting, when no data has to be transmitted again, resume the fake link mechanism and stop normal link operation.

It is noted that the proposed fake link mechanism can be used in every 10BASE-T network device or other network devices. In lighting equipment which is connected via Ethernet (especially using PoE), reduction of power consumption is critical since their are stringent rules for standby consumption of devices. However, reduction of power consumption is certainly desirable in other fields as well.

In the following, a more detailed implementation of the proposed transmission control for an exemplary Ethernet connection according to a second embodiment is described based on FIGS. 2 and 3, starting from a conventional circuitry.

Figure 2:
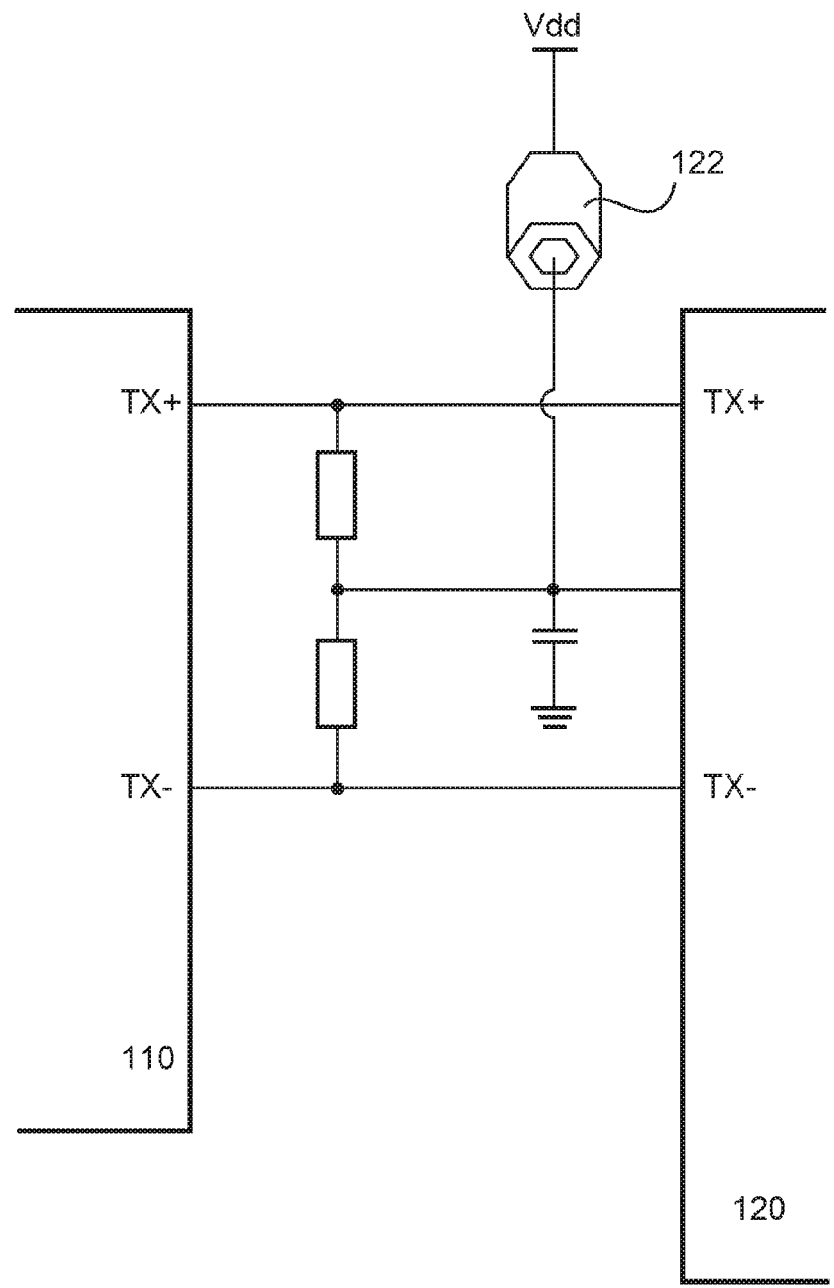
FIG. 2 shows a schematic circuit diagram of a conventional Ethernet transmission control circuit.

FIG. 2 shows a conventional transmission (TX) implementation of an Ethernet device with an internal link between an Ethernet controller 110 and an Ethernet port 120, where the connection to the external Ethernet link may be achieved via the Ethernet port 120 which may be a single port RJ45 Ethernet jack (e.g. Magjack) with built-in transformer (magnetics), status light emitting diodes (LEDs), and shielding. Physically, the Ethernet controller 110 has a differential transmit output consisting of two output lines TX− and TX+ and continuously drains a bias current from a power source Vdd via a Ferrite bead 122 and a symmetrizing and/or filtering resistor-capacitor (RC) combination in both output lines TX− and TX+. The Ferrite bead 122 is a passive electric component used to suppress high frequency noise in electronic circuits. It is a specific type of electronic choke. The Ferrite bead 122 employs a dissipation of high frequency currents in a ferrite ceramic to provide high frequency noise suppression. It may also be called block, core, ring, electromagnetic interference (EMI) filter, or choke.

To send data, the current sunk or drain into lines TX− and TX+ is differentially changed. A link pulse of a length between 100 and 200 ns, with a repetition time of 16 ms +/−8 ms keeps the link activated or up in 10BASE-T systems. 100BASE-T uses a pulse train of 2 ms every 16 ms +/−8 ms for auto-negotiation and an idle byte during inactive link. 1000BASE-T uses again another mechanism with pulses. During an inactive link, only the pulses to keep the link activated or the idle bytes are sent. This leaves a long time where only useless current is sunk into the system for only keeping the link up. In the idle modus of a device there is no need to communicate with other devices in the network. Only occasionally the device has to send some data, for example in a Dynamic Host Configuration Protocol (DHCP) renewal.

Figure 3:
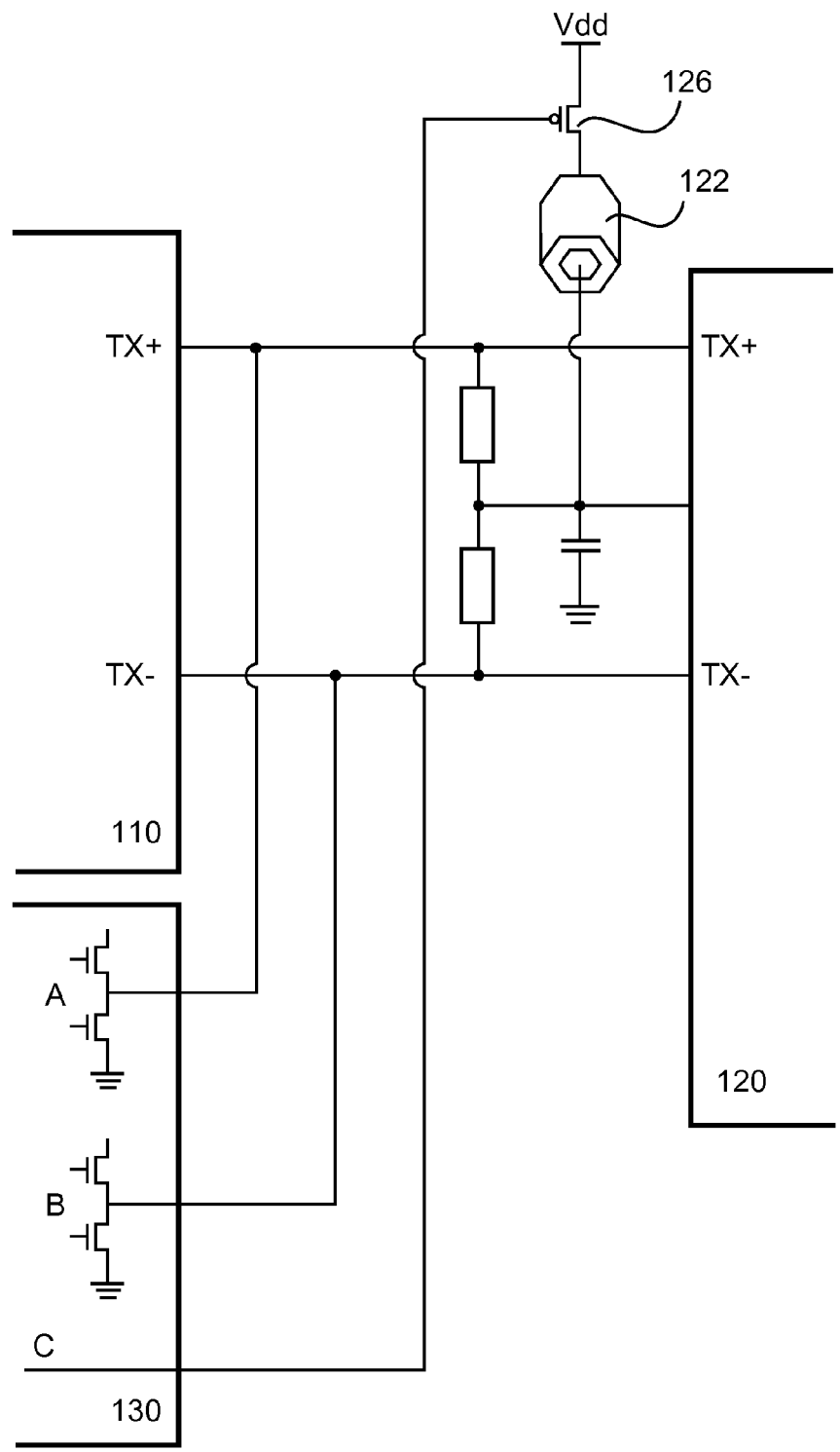
FIG. 3 shows a schematic circuit diagram of an Ethernet transmission control circuit according to a second embodiment.

FIG. 3 shows a proposed improval of the transmission (TX) implementation of in the Ethernet device according to a second embodiment with an implementation of the proposed fake link mechanism for saving idle transmit power. A link control unit 130, which may be a micro controller or oscillator or the like, detects whether data is to be transmitted on the Ethernet link. When no data is to be transmitted, the link control unit 130 switches to a power-saving mode and sets the Ethernet controller 110 into a listen-only mode by switching off the TX+ and TX− outputs of the Ethernet controller 110. Furthermore, during the power-saving mode, the link control unit 130 generates simulated or fake link activation signals necessary to keep the Ethernet link up or activated. This is achieved by generating positive-only pulses on the TX+ or TX− lines via respective output circuits A and B so as to simulate the LIT pulses which normally would be generated by the Ethernet controller 110. These fake link activation signals are then transmitted to the external Ethernet connection (not shown) via the Ethernet port 120.

Furthermore, the bias current which is normally drawn from the power source Vdd by the TX+ and TX− connections of the Ethernet controller 110 is interrupted by the link control unit 130 via a control output C supplied to a switching transistor 126 between the power source Vdd and the Ferrite bead 122. The switching transistor 126 is thus controlled by the link control unit 130. The saved bias current is the largest amount of power in the Ethernet interface circuitry which otherwise would be "thrown away" when there is no data sent.

It is however noted that the efficient generation of the activation signals with the output circuits (e.g. switches) A and B and the connection to the TX+ and TX− wires of FIG. 3 may as well be modified by using only one output circuit A or B and a respective connection to the TX+ or TX− line.

Furthermore, it is noted that the proposed fake link mechanism (i.e. output circuits A, B and C and any corresponding control circuit(s)) for saving idle transmit power, as shown in FIG. 3, may as well be integrated in the network chip of the Ethernet controller 110.

On a test implementation of the proposed circuit, a power consumption reduction of 65% has been achieved. The power consumption went down from 561 mW to 195 mW. By further improvement of hardware and software, even a power reduction of 91% could be achieved by reducing power consumption to 50 mW, starting at 561 mW. The biggest impact for this reduction from 65% to 91% was to put the link control unit 130 in a sleep mode for some time, and provide regularly checking whether data is received or data needs to be transmitted.

There may be several other ways of implementing the proposed link faking mechanism, but they all result in the same behaviour on the data connection cable (e.g. Ethernet cable). Namely, only signals or pulses to keep the link up in a power efficient way are sent.

Furthermore, in an alternative software-based implementation, the required functionalities can be implemented in a computer device with a processing unit which performs control based on software routines of a control program stored in a memory. The control program may also be stored separately on a computer-readable medium. Program code instructions are fetched from the memory and are loaded to the control unit of the processing unit in order to perform the functions of the steps or stages described in connection with FIGS. 1 to 3, which may be implemented as the above mentioned software routines. The processing steps may be performed on the basis of input data and may generate output data. In the present link faking mechanism, the input data may correspond to an information whether data is to be transmitted on the data connection, and the output data may correspond to the control information and faked link activation signals generated by the link control function or unit 30.

Consequently, the functionalities of the above embodiments may be implemented as a computer program product comprising code means for generating each individual step of the proposed channel estimation when run on a computer device or data processor.

To summarize, a method and apparatus for disconnecting a bias current circuitry in a way that there is no bias current flowing anymore for the transmit output of a network controller, e.g., Ethernet controller, have been described. Also, the data connection, e.g., TX+ and TX− lines in an Ethernet port or connector, are connected to control circuitry to simulate an active connection by taking over supply of link activation pulses, e.g., LIT pulses. These two measures will allow the user to save the bias current on the transmit output and maintain the link activation signals to keep the link up towards a network controller.

While the invention has been illustrated and described in detail in the drawings and foregoing description, such illustration and description are to be considered illustrative or exemplary and not restrictive; the invention is not limited to the disclosed embodiment. The proposed disconnection of a controller output and generation of fake link activation signals may be implemented in any device which is connected to a network requiring a signaling to keep network connections active. Other variations to the disclosed embodiment can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for controlling data transport via a network connection, said apparatus being adapted to switch a network controller into a power-saving mode by interrupting a supply of power to an output of the network controller and to generate and supply simulated link activation signals to said network connection, when no data is to be transmitted via said network connection.

2. The apparatus according to claim 1, wherein said apparatus is adapted to set said network controller into a listen-only mode where at least a transmitter part of the network controller is switched off or deactivated through a transmission control signal generated by the apparatus so that the network controller can only receive data but can not transmit data via said network connection.

3. The apparatus according to claim 2, wherein said supply of power is achieved by a bias current supplied to a differential transmit output of said network controller.

4. The apparatus according to claim 2, wherein said network controller is an Ethernet controller and said network connection is an Ethernet link.

5. The apparatus according to claim 1, wherein said link activation signals comprise link integrity test pulses.

6. The apparatus according to claim 1, wherein said apparatus comprises a micro controller or an oscillator or a pulse generator.

7. A network device comprising an apparatus according to claim 1 and said network controller, wherein a transmitting part of said network controller is controlled by said apparatus so as to set said network controller into a listen-only mode where at least a transmitter part of the network controller is switched off or deactivated through a transmission control signal generated by the apparatus so that the network controller can only receive data but can not transmit data via a network connection, when no data is to be transmitted by said network device via said network connection.

8. The network device according to claim 7, further comprising a switching element controlled by said apparatus to disconnect a power supply from said output of said network controller.

9. The network device according to claim 7, wherein said network device comprises a lighting equipment.

10. A system comprising:
   a. at least one network device comprising an apparatus as defined in claim 1; and
   b. at least one network connection for transmitting data between said network controller (10) and a network.

11. The system according to claim 10, wherein said network device comprises a power supply unit arranged for powering said network device via said network connection.

12. The system according to claim 10, wherein said power supply unit comprises a Power over Ethernet unit.

13. A method of controlling data transport via a network connection, said method comprising:
   a. generating simulated link activation signals; and
   b. switching off a power supply to an output of a network controller and taking over supply of link activation signals from the network controller by supplying the simulated link activation signals to said network connection, when no data is to be transmitted via said network connection.

14. A computer program product comprising code means for producing the steps of claim 13 when run on a computer device.

* * * * *